United States Patent [19]

Seki et al.

[11] Patent Number: 4,855,926
[45] Date of Patent: Aug. 8, 1989

[54] COMPLEX CURVED SURFACE CREATION METHOD

[75] Inventors: Masaki Seki; Norihisa Amano, both of Tokyo, Japan

[73] Assignee: Fanuc Ltd, Minamitsuru, Japan

[21] Appl. No.: 32,516

[22] PCT Filed: Jun. 19, 1986

[86] PCT No.: PCT/JP86/00310

§ 371 Date: Feb. 12, 1987

§ 102(e) Date: Feb. 12, 1987

[87] PCT Pub. No.: WO86/07645

PCT Pub. Date: Dec. 31, 1986

[30] Foreign Application Priority Data

Jun. 20, 1985 [JP] Japan ................... 60-135055

[51] Int. Cl.⁴ ............................. G06F 15/46
[52] U.S. Cl. ................. 364/474.29; 364/474.25
[58] Field of Search .................. 364/167–171, 364/191–193, 474, 475; 318/568

[56] References Cited

U.S. PATENT DOCUMENTS

| | | | |
|---|---|---|---|
| 4,491,906 | 1/1985 | Kishi et al. | 364/191 |
| 4,523,270 | 6/1985 | Kishi et al. | 364/191 |
| 4,546,427 | 10/1985 | Kishi et al. | 364/168 |
| 4,569,014 | 2/1986 | Kishi et al. | 364/191 |
| 4,589,062 | 5/1986 | Kishi et al. | 364/168 |

Primary Examiner—John R. Lastova
Attorney, Agent, or Firm—Staas & Halsey

[57] ABSTRACT

The invention relates to a complex curved surface creation method for generating a curved surface in which roundness (ARC) of a radius R is provided at a portion where a first curve (11) approximated by straight lines on a first three-dimensional curved surface (1) intersects a second curve (12) approximated by straight lines on a second three-dimensional curved surface (2). Among line segments ($P_iP_{i-1}$) constituting the first curve (11) and line segments ($P_jP_{j+1}$) constituting the second curve (12), one line segment is selected from each curve in the order of their nearness to a point of intersection ($P_0$) of the two curves. Next, it is determined whether a circular arc of radius R to which both of the line segments ($P_iP_{i-1}$, $P_jP_{j+1}$) are tangent exists. If such a circular arc does exist, the circular arc is inserted at the portion where the two curves intersect, thereby rounding the intersection. If such a circular arc does not exist, the next nearest line segments to the point of intersection ($P_0$) are selected, similar processing is repeated and a circular arc is inserted at the portion where the two curves intersect, thereby rounding the intersection.

7 Claims, 6 Drawing Sheets

COMPLEX CURVED SURFACE CREATION METHOD

BACKGROUND OF THE INVENTION

1. Background of the Invention

This invention relates to a method of generating a complex curved surface by comining at least two three-dimensional curved surfaces, and more particularly, to a method of generating a complete curved surface in which roundness of a prescribed radius is provided at a portion where a first curve approximated by straight lines on a first three-dimensional curved surface intersects a second curve approximated by straight lines on a second three-dimensional curved surface.

2. Description of the Related Art

A curved surface of a three-dimensional metal mold or the like on a design drawing is generally expressed by a plurality of section curves, but no profile data is shown for the shape of the area lying between a certain section curved and the next adjacent section curve. In numerically controlled machining it is essential that machining be carried out so as to smoothly connect these two section curves despite the fact that the profile between them is not given. In other words, this means that machining must be performed by generating the curved surface between the two section curves from such data as that indicative of the section curves, recording on an NC tape the data concerning the generated curved surface, and carrying out machining in accordance with commands from the NC tape. To this end, there has been developed and put into practical use a method comprising generating a plurality of intermediate sections in accordance with predetermined rules using data specifying several sections and section curves of a three-dimensional curved body, finding a section curve (intermediate section curve) on the curved body based on the intermediate sections, and generating a curved surface of the three-dimensional body based on the plurality of generated intermediate section curves. For example, see the specification of Japanese Patent Application Laid-Open No. 57-5109 (corresponding to U.S. Pat. No. 4,491,906), and "Introduction to NC Programming", published by Nikkan Kogyo Shimbunsha, Oct. 30, 1981, pp. 156–162. This method is useful in generating a smooth curved surface from section data.

Depending upon machining, there are cases where it is required to machine a complex curved surface obtained by combining two or more three-dimensional curved surfaces, or in other words, to create a complex curved surface. However, it is not possible with the prior art to create a complex curved surface in a simple manner by combining these three-dimensional curved surfaces using the data indicative of each three-dimensional curved surface. Accordingly, the applicant has proposed in Japanese Patent Application No. 60-39445 a novel method of creating complex curved surfaces.

In brief, the proposed method of creating complex curved surfaces includes inputting data for specifying each three-dimensional curved surface constituting a complex curved surface, inputting data specifying one line of intersection on a predetermined plane (e.g. the X-Y plane) as well as a rule for specifying a number of lines of intersection on the X-Y plane on the basis of said line of intersection, finding a section curve of the complex surface based on a section which has an i-th line of intersection, among the number of lines of intersection, as its line of intersection with the X-Y plane, thereafter obtaining, in a similar manner, section curves based on sections corresponding to respective ones of the lines of intersection, and generating a complex curved surface by assembling the section curves.

There are cases where it is desired to provide a fillet surface (i.e. a rounded surface) of a radius R at the boundaries of the three-dimensional curved surfaces constituting the complex curved surface. However, the conventional arrangement is not capable of providing such a fillet surface by a simple method.

SUMMARY OF THE INVENTION

Accordingly, an object of the present invention is to provide a complex curved surface creation method whereby a fillet surface can be simply inserted at the boundary of a three-dimensional curved surface constituting a complex curved surface.

The present invention provides a complex curved surface creation method for generating a curved surface in which roundness of a radius R is provided at a portion where a first curve approximated by straight lines on a first three-dimensional curved surface intersects a second curve approximated by straight lines on a second three-dimensional curved surface.

Among line segments constituting the first and second curves, one line segment is selected from each curve in the order of their nearness to a point of intersection of the two curves.

Next, it is determined whether a circular arc of radius R to which both of the line segments are tangent exists. If such a circular arc does exist, the circular arc is inserted at the portion where the two curves intersect.

If such a circular arc does not exist, the next nearest line segments to the point of intersection are selected, the above processing is repeated and a circular arc is inserted at the portion where the two curves intersect.

If a distance D between starting points $P_{-S}$, $P_S$ of the line segments selected from the respective first and second curves satisfies the relation $$D > 2 \cdot R$$

a decision is rendered to the effect that rounding having the radius R is impossible to perform.

DESCRIPTION OF THE PREFERRED EMBODIMENTS

Figure 1:
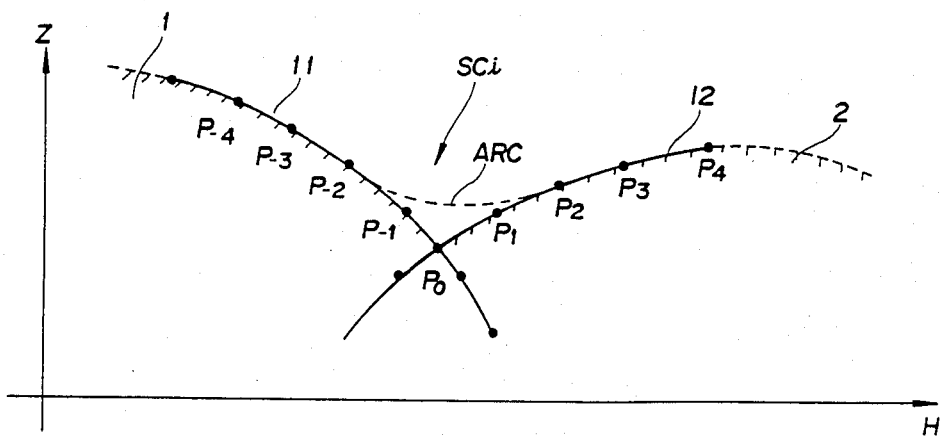
FIG. 1 is an explanatory view of the present invention.

FIG. 1 is a view for explaining a method of creating a complex curved surface in accordance with the present invention. In FIG. 1, $SC_i$ denotes a section curve obtained when a complex curved surface is cut by a predetermined section, numerals 1, 2 denote respective first and second three-dimensional curved surfaces constituting the complex curved surface, and numerals 11, 12 designate respective first and second curves, each of which is approximated by straight lines, constituting the section curve $SC_i$. Further, $P_O$ represents the point at which the first curve 11 and second curve 12 intersect each other, $P_i$ ($i=0, -1, -2, \ldots$) denotes a linear approximation point, these points being located one after another from the point of intersection $P_0$ to the starting point of the first curve 11, $P_j$ ($j=0, 1, 2, \ldots$) denotes a linear approximation point, these points being located one after another from the point of intersection $P_0$ to the end point of the second curve 12, and ARC represents roundness (i.e. a circular arc) inserted at the portion where the first and second curves intersect each other.

If the portion at which the first and second curves 11, 12 approximated by the straight lines intersect is provided with roundness of radius R, first it is assumed that $i=0$, $j=0$ hold, then the operations $P_i \rightarrow P_{-S}$, $P_{i-1} \rightarrow P_{-E}$ and $P_j \rightarrow P_S$, $P_{j+1} \rightarrow P_E$ are performed. Points of tangency $P_{-T}$, $P_T$ (not shown) at which the two straight lines $P_{-S}P_{-E}$ and $P_SP_E$ are tangent to a circle of radius R are obtained. Next, it is determined whether the points of tangency $P_{-T}$, $P_T$ lie between $P_{-E} \sim P_O$ and $P_O \sim P_E$, respectively. If both do, then a circular arc $\overparen{P_{-T}P_T}$ is adopted as the roundness ARC or rounded section inserted at the portion of intersection. The roundness to be inserted at the portion of intersection is found by repeating the above processing, with the operation $1-i \rightarrow i$ being performed when $P_{-T}$ does not lie between $P_{-E} \sim P_O$ and the operation $j+1 > j$ when $P_T$ does not lie between $P_O \sim P_E$. Further, it is determined whether the distance between $P_{-S}$ and $P_S$ is greater than $2R$; if it is, a decision is rendered to the effect that rounding having the radius R is impossible to perform.

Figure 2:
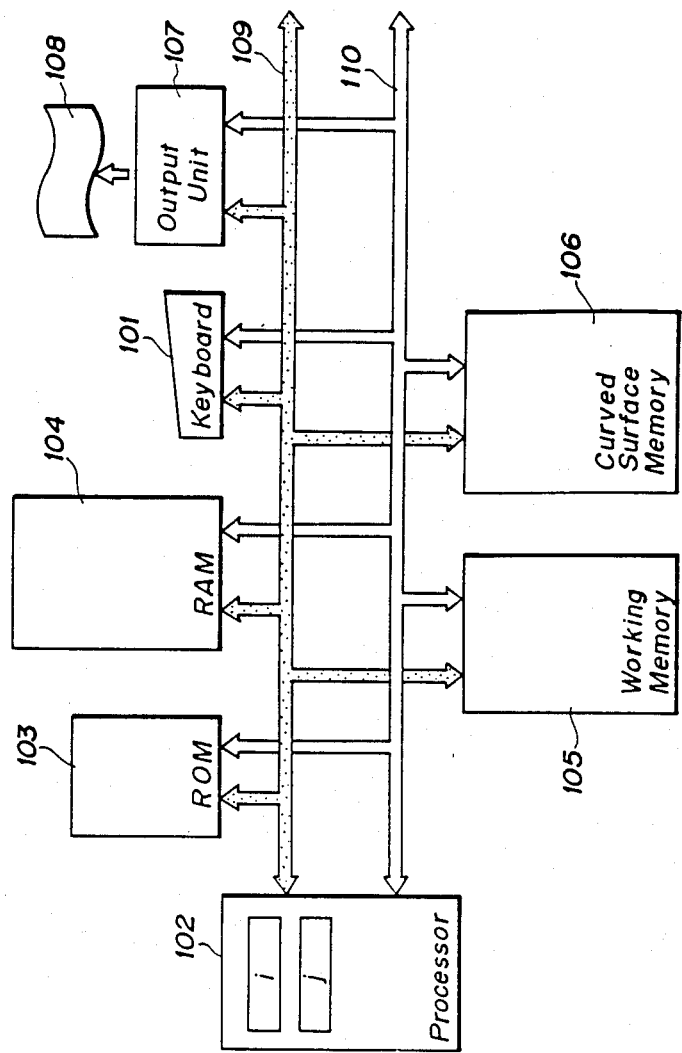
FIG. 2 is a block diagram of an apparatus for realizing the prepent invention.

FIG. 2 is a block diagram of an automatic programming apparatus for realizing the method of the present invention. Numeral 101 denotes a keyboard for data input; 102 a processor; 103 a ROM storing a control program; 104 a RAM; and 105 a working memory. Numeral 106 designates a curved surface memory for storing curved surface data indicative of a generated complex curved surface as well as NC program data for curved surface machining; 107 an output unit for outputting curved surface data indicative of a generated complex curved surface or NC program data for curved surface machining to an external storage medium 108 such as a paper tape or magnetic tape; 109 an address bus; and 110 a data bus.

A method of creating a complex curved surface in accordance with the present invention will now be described. In the method described, first a complex curved surface in which the boundary of a three-dimensional curved surface does not have a fillet surface will be generated, then a fillet surface will be inserted at the boundary.

Figure 3A:
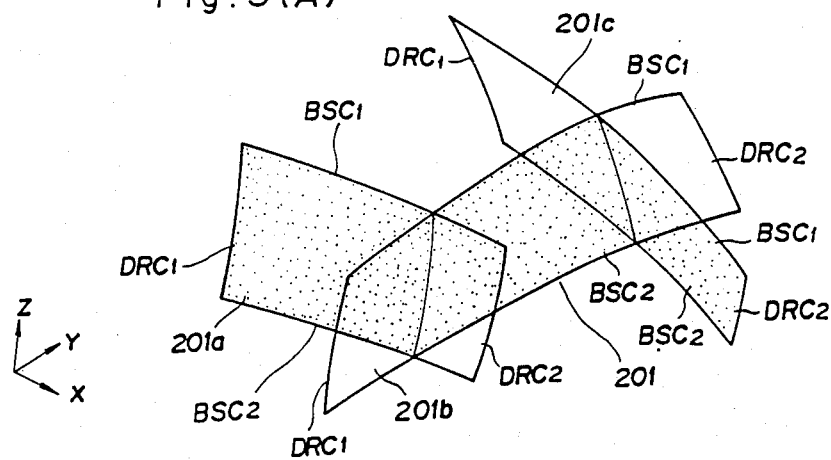
FIGS. 3a–3c are explanatory views of complex curved surface creation in which a boundary does not have a fillet surface.

(A) Complex curved surface creation processing (a) First, data are entered from the keyboard 101 specifying a first three-dimensional curved surface 201a, a second three-dimensional curved surface 201b, a third three-dimensional curved surface 201c . . . constituting a complex curved surface 201 [see (A) of FIG. 3]. In addition, a starting curved surface (assumed to be the first three-dimensional curved surface) is designated as well as the order in which the curved surfaces are combined (the order is assumed here to be the first curved surface, the second curved surface, the third curved surface, . . . , and so on), this being necessary in generating the complex curved surface. These inputted data are stored in the RAM 104 (FIG. 2). Each of the three-dimensional curved surfaces 201a–201c is specified by two operating curves DRC1, DRC2 and two base curves BSC1, BSC2, etc. Accordingly, each of the three-dimensional curved surfaces is specified by entry of these curve data and the like (see U.S. Pat. No. 4,491,906).

(b) Next, data are inputted from the keyboard 101 for specifying a number of sections perpendicular to the X-Y plane, which cuts the complex curved surface 201, and these data are stored in the RAM 104. More specifically, a single line of intersection on the X-Y plane is inputted, as well as a rule for specifying a number of lines of intersection on the X-Y plane on the basis of the single line of intersection.

Figure 4A:
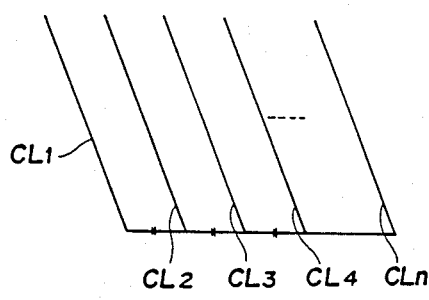
FIGS. 4a–4c are views for explaining a method of specifying a section used in creating a complex curved surface.

By way of example, in a case where the sections are parallel to one another and perpendicular to the X-Y plane and, moreover, the spacing between adjacent sections is constant, the line of intersection $CL_i$ ($i=1, 2, 3, \ldots$) between each section and the X-Y plane is as shown in FIG. 4(A). In such case, therefore, data specifying the first line of intersection $CL_l$, as well as the distance between two adjacent lines of intersection (either the distance along the X axis or the distance along the Y axis will suffice), are inputted.

Figure 4B:
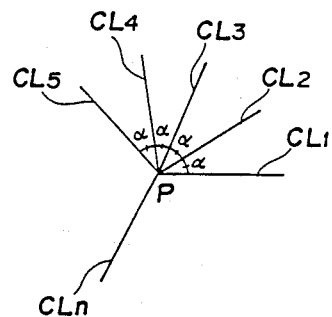

In a case where the sections intersect one another in a straight line perpendicular to the X-Y plane and, moreover, the angles between adjacent sections are constant, lines of intersection $CL_i$ ($i=1, 2, 3, \ldots$) between the sections and the X-Y plane intersect successively at equal angles at a single point P, as shown in FIG. 4(B). In such case, therefore, data are inputted specifying the first line of intersection $CL_1$ and the point P, and an angle $\alpha$ defined by two mutually adjacent lines of intersection is also inputted.

Figure 3B:
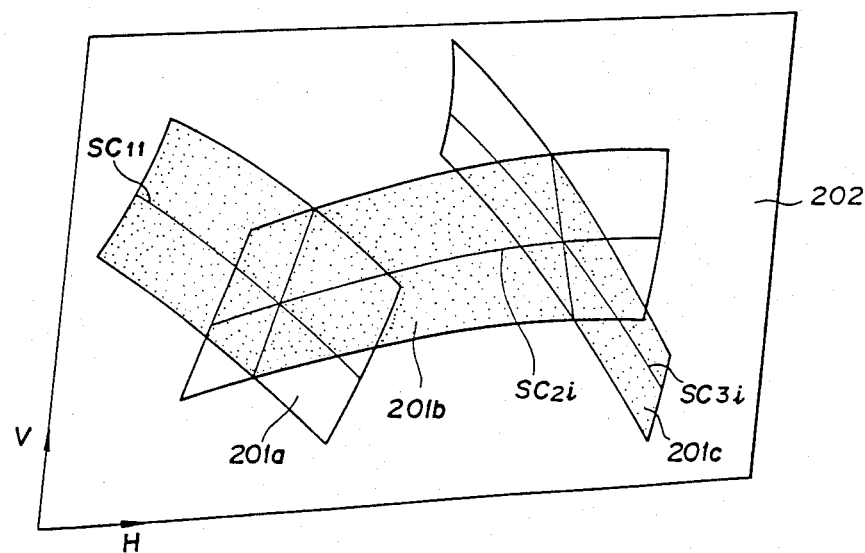
Figure 4C:
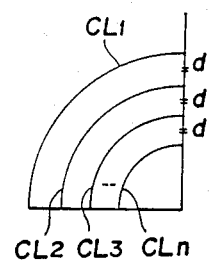

Further, in a case where the sections are mutually concentric cylinders perpendicular to the X-Y plane and, moreover, the spacing between adjacent sections is constant, the lines of intersection $CL_i$ ($i=1, 2, 3, \ldots$) between the sections and the X-Y plane are concentric circular arcs, as shown in FIG. 4(C). In such case, therefore, data are inputted specifying the first line of intersection $CL_1$, and the distance d between two mutually adjacent lines of intersection is also inputted. If the lines of intersection shown in FIG. 4(A) and the rule are inputted, the three-dimensional curved surfaces 201a–201c are cut by a predetermined plane 202 [see FIG. 3(B)] specified by one of the lines of intersection and the rule. The section curves that result are $SC_{1i}$, $SC_{2i}$, $SC_{3i}$, . . . and so on.

Figure 5:
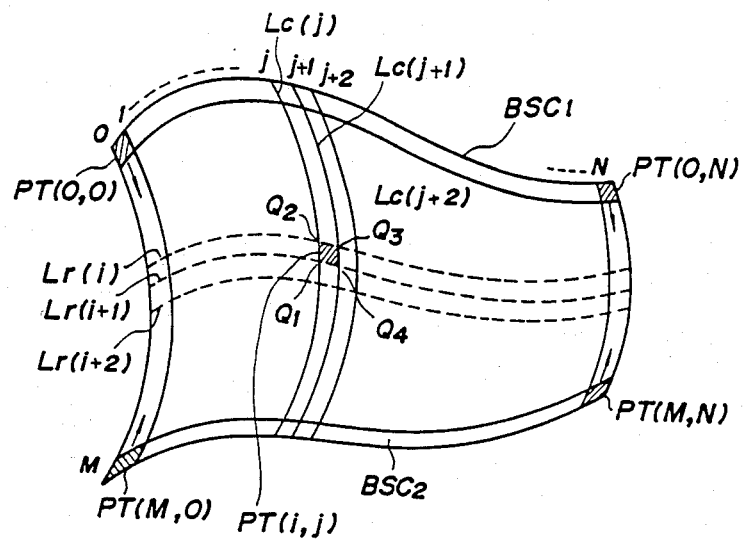
FIG. 5 is an explanatory view of a patch.

(c) When these data have been entered, the processor 122 generates each of the three-dimensional curved surfaces 201a–201c by a well-known method. As shown in FIG. 5, let $L_c(j)$ express an intermediate section curve containing a j-th dividing point on a base curve $BSC_1$ of a generated three-dimensional curved surface, and let $L_r(i)$ express a curve obtained by connecting an i-th dividing point on each of the intermediate section curves $L_c(j)$ (j=1, 2, 3, ... n). A quadrilateral bounded by curves $L_c(j)$, $L_c(j+1)$, $L_r(i)$ and $L_r(i+1)$ shall be referred to as a "patch" PT (i, j). The four vertices $Q_1$, $Q_2$, $Q_3$, $Q_4$ of the patch PT (i, j) are generated by the well-known curved surface creation processing described above and are stored in the curved surface memory 106.

When the processing for generating each curved surface in accordance with step (c) is completed, processing for creating a complex curved surface begins, as follows:

(d) First, the operation 1→i is performed.

(e) Next, the operation 1→k is performed.

(f) The processor 102 then obtains a line of intersection $CL_i$ on the i-th X-Y plane by using the data indicative of the 1st line of intersection and the spacing between the lines of intersection obtained in step (b).

(g) When the i-th line of intersection $CL_i$ has been found, the processor 102 finds the points of intersection between the i-th line of intersection $CL_i$ and the sides of projection patches, which are obtained by projecting each patch (see FIG. 5) of the j-th three-dimensional curved surface onto the X-Y plane.

Figure 6:
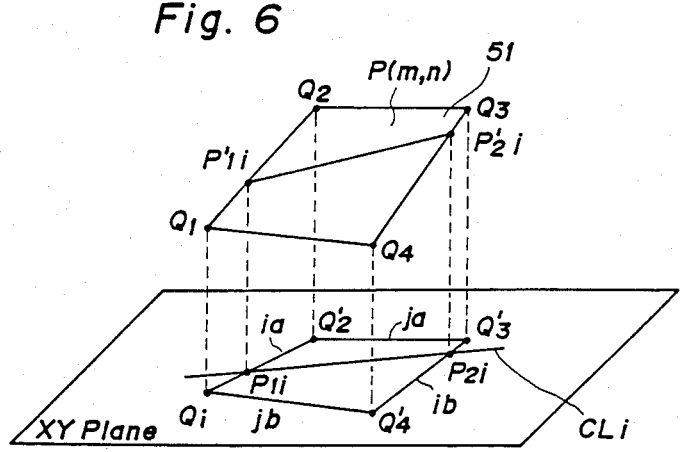
FIG. 6 is a view for describing a method of calculating coordinates of a point on a curved surface.

(h) When the coordinates of all points of intersection between the sides of several projection patches and the i-th line of intersection $CL_i$ have been obtained, the coordinates of points on the j-th three-dimensional curved surface corresponding to these points of intersection are computed. Specifically, the coordinates of the points on the j-th curved surface, which points are obtained by projecting the points of intersection onto the X-Y plane, are found. FIG. 6 is a view for describing a method of computing the coordinates of the points on the curved surface. Four sides $i_a$, $i_b$, $j_a$, $j_b$ are obtained by projecting a predetermined patch P (m, n) on a three-dimensional curved surface onto the X-Y plane. Let $P_{1i}$, $P_{2i}$ represent the points of intersection between the i-th line of intersection $CL_i$ and a predetermined two of these four sides, and let $(x_{1i}, y_{1i})$, $(x_{2i}, y_{2i})$ represent the coordinates of these points of intersection. Further, let $Q_1'$, $Q_2'$ denote the end points of the side $i_a$ intersected by the line of intersection $CL_i$, let $Q_3'$, $Q_4'$ denote the end points of the side $i_b$ intersected by the line of intersection $CL_i$, let $Q_i$ (i=1-4) represent the points on the three-dimensional curved surface that correspond to the points $Q_i'$ (i=1-4), and let $(x_i, Y_i, Z_i)$ denote the coordinates of each of the points $Q_i$. Then, the Z coordinates $z_{1i}$, $z_{2i}$ of the points $P_{1i}'$, $P_{2i}'$ on the curved surface that correspond to the points of intersection $P_{1i}$, $P_{2i}$ are calculated in accordance with the following equations:

$$z_{1i} = z_1 + (z_2 - z_1)(x_{1i} - x_1)/(x_2 - x_1)$$

$$z_{2i} = z_3 + (z_4 - z_3)(x_{2i} - x_3)/(x_4 - x_3)$$

The coordinates of the points on the curved surface will be $(x_{1i}, y_{1i}, z_{1i})$, $(x_{2i}, y_{2i}, z_{2i})$ The coordinates of points on the j-th three-dimensional curved surface that correspond to all of the points of intersection are found through the foregoing procedure and these coordinates are stored in the curve surface memory 106. This will provide a section curve $SC_{ji}$ obtained when the j-th three-dimensional curved surface is cut by a section corresponding to the i-th line of intersection CL.

(i) Next, the processor 102 checks whether the section curves for all three-dimensional curved surfaces have been obtained.

(j) If the section curves [$SC_{1i}$, $SC_{2i}$, $SC_{3i}$, ... in FIGS. 3(B), (C)] of all three-dimensional curved surfaces have not been obtained, the operation j+1→j is performed and the processing from step (g) onward is repeated.

Figure 3C:
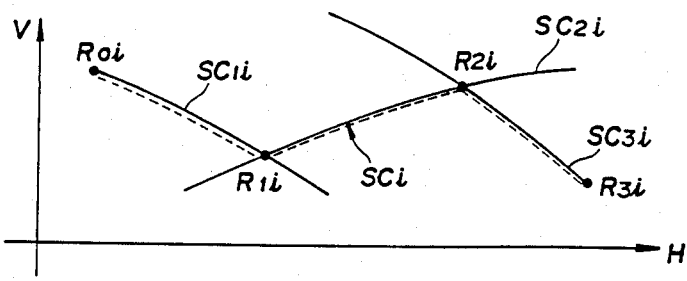

(k) If the section curves ($SC_{1i}$, $SC_{2i}$, $SC_{3i}$, ...) of all three-dimensional curved surfaces have been obtained, on the other hand, the section curve SCi [see the dashed line in FIG. 3(C)] of the complex curved surface 201 is found through the following processing: Specifically, a point of intersection $R_{ji}$ (j=1, 2, 3, ...) between the section curve $SC_{ji}$ and a section curve $SC_{(j+1)i}$ (j=1, 2, 3, ...) is calculated. When a point of intersection $R_{ji}$ (j=1, 2, ...) has been found as set forth above, a section curve $SC_i$ corresponding to the i-th line of intersection $CL_i$ is specified by a section curve $SC_{1i}$ between points of intersection $R_{0i}$, $R_{1i}$, a section curve $SC_{2i}$ between points of intersection $R_{1i}$, $R_{2i}$, and a section curve $SC_{3i}$, ... between points of intersection $R_{2i}$, $R_{3i}$.

(m) When the section curve $SC_i$ has been found, it is checked whether section curves corresponding to all lines of intersection $CL_i$ have been obtained.

(n) If section curves corresponding to all lines of intersection have not been obtained, the operation i+1→i is performed and processing from step (e) onward is repeated.

(p) If section curves corresponding to all lines of intersection have been obtained, however, the processing for creating the complex curved surface ends.

(B) Rounding Processing

Figure 7:
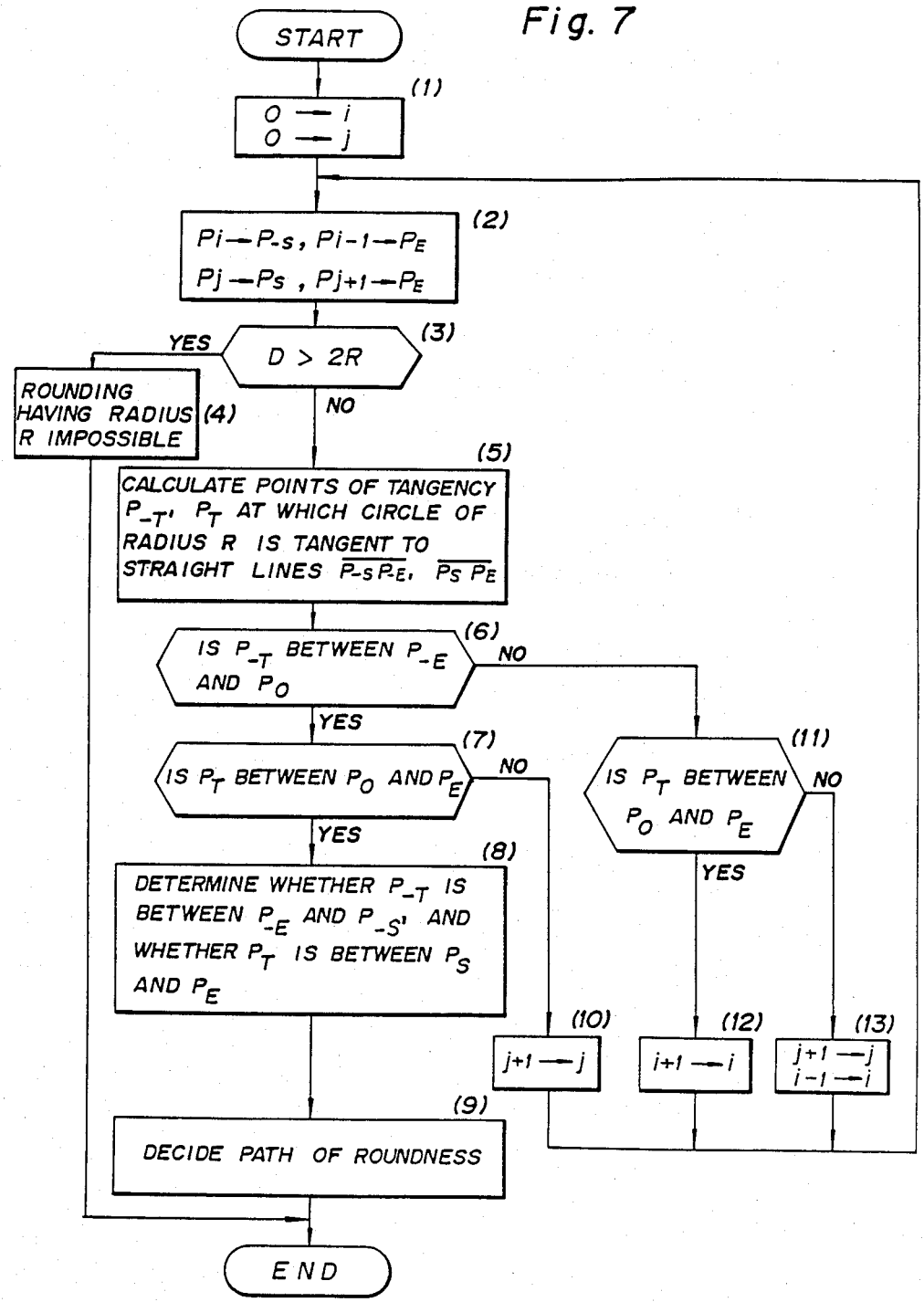
FIG. 7 is a flowchart of rounding processing according to the present invention.

If it is required to insert a fillet surface of radius R, rounding processing in accordance with the flowchart shown in FIG. 7 is executed after the section curve $SC_i$ has been obtained by the above-described processing, or after all of the section curves SCi (i =1, 2, ...) have been obtained to conclude complex curved surface creation processing.

Let two mutually adjacent curves approximated by straight lines and constituting the section curve $SC_i$ be represented by 11 and 12, as shown in FIG. 1, let the point of intersection of the first curve 11 and second curve 12 be $P_0$, let straight line approximation points located one after another from the point of intersection $P_0$ to the starting point of the first curve 11 be denoted by $P_i$ (i=0, −1, −2, ...), and let straight line approximation points located one after another from the point of intersection $P_0$ to the end point of the second curve 12 be denoted by $P_j$ (j=0, 1, 2, ...

Rounding processing will now be described in accordance with FIGS. 1, 7 and 8.

(1) First, the operations 0→i, 0>j are performed.

(2) Next, the operations $P_i \to P_{-S}$, $P_{i-1} \to P_{-E}$ are performed, and then the operations $P_j \to P_S$, $P_{j+1} \to P_E$.

(3) Thereafter, the distance D between the point $P_{-S}$ and the point $P_S$ is found, then D and 2·R are compared in terms of magnitude.

(4) If D>2·R holds, rounding of radius R is deemed impossible and rounding processing is terminated.

Figure 8:
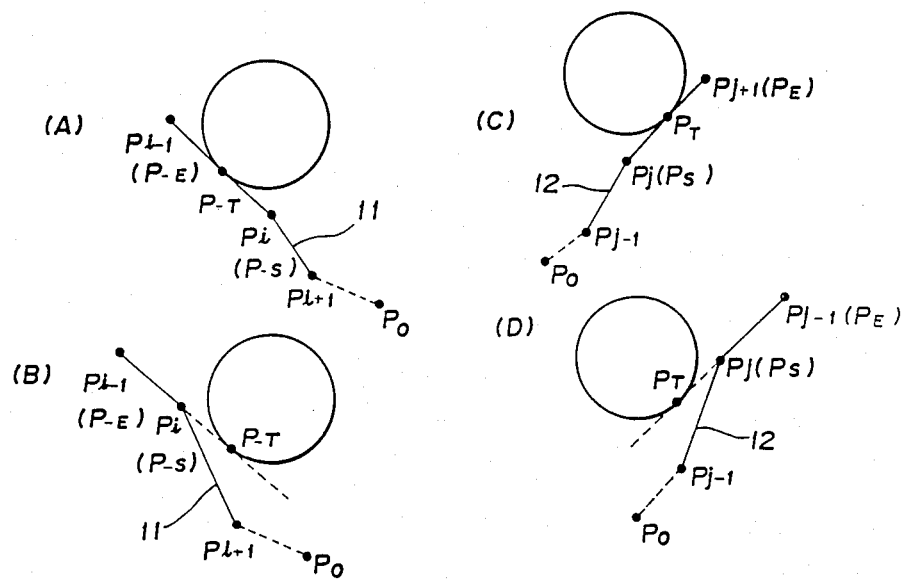
FIG. 8 is an explanatory view of rounding processing according to the present invention.

(5) If D≦2·R holds, on the other hand, points of tangency $P_{-T}$, $P_T$ at which the two straight lines $P_{-S}P_{-E}$ and $P_S P_E$ are tangent to a circle of radius R are obtained (see FIG. 8). It should be noted that the straight line $P_{-S}P_{-E}$ referred to here means a straight line of infinite length passing through the points $P_{-S}$, $P_{-E}$. The same will hold for other straight lines hereinbelow.

(6) Next, it is determined whether the point of tangency $P_{-T}$ lies between $P_{-E} \sim P_O$. More specifically, it is determined whether $(P_{-E})_H < (P_{-T})_H$ holds, where $(P_{-E})_H$ represents the H-axis coordinate of the point $P_{-E}$ and $(P_{-T})_H$ represents the H-axis coordinate of the point $P_{-T}$.

(7) If the point of tangency $P_{-T}$ lies between $P_{-E} \sim P_O$ [see FIG. 8(A) or (B)], then it is determined whether the point of tangency $P_T$ lies between $P_O \sim P_E$, that is whether $(P_T)_H \leq (P_E)_H$ holds.

(8) If the point of tangency $P_T$ lies between $P_O \sim P_e$ [see FIG. 8(C) or (D)], then it is determined whether the point of tangency $P_{-T}$ lies between $P_{-E} \sim P_{-s}$ [FIG. 8(A)] and whether the point of tangency $P_T$ lies between $P_S \sim P_E$ [FIG. 8(C)].

(9) If the points of tangency $P_T$, $P_{-T}$ are as shown in FIGS. 8(A), (C), respectively, then the following is taken as the path for rounding:
$$\ldots \overline{P_{i-1}P_{-T}} \rightarrow \overset{\frown}{P_{-T}P_T} \rightarrow \overline{P_T P_{j+1}} \rightarrow \ldots$$

If the points of tangency are shown in FIGS. 8(A), (D), on the other hand, then the following is taken as the path for rounding:
$$\overline{P_{i-1}P_{-T}} \rightarrow \overset{\frown}{P_{-T}} \rightarrow \overline{P_{-T} P_j} \rightarrow \overline{P_j P_{j+1}} \rightarrow \ldots$$

If the points of tangency are as shown in FIGS. 8(B), (C), then the following is taken as the path for rounding:
$$\ldots \overline{P_{i-1}P_i} \rightarrow \overline{P_i P_{-T}} \rightarrow \overset{\frown}{P_{-T}P_T} \rightarrow \overline{P_T P_{j+1}} \rightarrow \ldots$$

If the points of tangency are as shown in FIGS. 8(B), (D), then the following is taken as the path for rounding:
$$\ldots \overline{P_{i-1}P_i} \rightarrow \overline{P_i P_{-T}} \rightarrow \overset{\frown}{P_{-T}} \rightarrow \overline{P_T P_j} \rightarrow \overline{P_j P_{j+1}} \ldots$$

The foregoing completes rounding processing and is followed by execution of rounding processing for the next intersection.

(10) If the point of tangency $P_T$ is found not to lie between $P_0$-$P_E$ at step (7), then the operation $j+1 \rightarrow j$ is performed and processing from step (2) onward is repeated.

(11) If the point of tangency $P_{-T}$ is found not to lie between $P_{-E} \sim P_0$ at step (6), then it is determined whether the point of tangency $P_T$ lies between $P_0 \sim P_E$, as in step (7).

(12) If $P_T$ lies between $P_0 \sim P_E$, the operation $i-1 \rightarrow i$ is performed and processing from step (2) onward is repeated.

(13) If $P_T$ is found not to lie between $P_O \rightarrow P_E$ at step (11), then the operations $j+1 \rightarrow j$, $i-1 \rightarrow i$ are performed and processing from step (2) onward is repeated.

When rounding processing has been performed for all section curves $SC_i$ ($i=1, 2, \ldots$) in the above manner, processing for creating a complex curved surface having a fillet surface at the boundary of mutuall adjacent three-dimensional curved surfaces ends.

In the foregoing, cases were verified in which the points of tangency $P_{-T}$, $P_T$ lie on extensions of the line segments $P_{-S}P_{-E}$, $P_S P_E$, respectively [see FIGS. 8(B), (D)]. However, it is permissible to limit the arrangement to cases where the points of tangency $P_{-T}$, $P_T$ lie on the line segments $P_{-S}P_{-E}$, $P_S P_E$, respectively [see FIGS. 8(A), (C)], rather than verifying the above-mentioned cases. If such an arrangement is adopted, then it would be determined whether the point of tangency $P_{-T}$ lies on the line segment $P_{-E}P_S$ at step (6) in the flowchart of FIG. 7, it would be determined whether the point of tangency $P_T$ lies on the line segment $P_E P_S$ at each of the steps (7), (11), step (8) would be deleted and the rounding path decided at step (9) would be $$\ldots \overline{P_{i-1}P_{-T}} \rightarrow \overset{\frown}{P_{-T}P_T} 43\, \overline{P_T P_{j+1}} \ldots$$

(C) Complex Curved Surface Data Processing

When creation of the complex curved surface subjected to rounding processing ends, the processor 102 outputs the complex curved surface data to the external storage medium 108 via the output unit 107 whenever required. Alternatively, the processor uses the complex curved surface data to create an NC program for machining the complex curved surface and then outputs the program to the memory 106 or external storage medium 108.

In accordance with the present invention described above, a fillet surface of radius R can be inserted, correctly and easily, at the boundary portions of three-dimensional curved surfaces constituting a complex curved surface. Accordingly, the invention is well suited for use in creating NC programs for machining complex curved surfaces.

We claim:

1. A complex curved machining surface creation method for generating a curved machining surface with a rounded section curve having a radius R provided at an intersection where a first curve approximated by straight lines on a first three-dimensional curved machining surface intersects a second curve approximated by straight lines on a second three-dimensional curved machining surface, wherein a point of intersection of the first an second curves being denoted by $P_0$, straight line approximation points located one after another from the point of intersection $P_0$ to a starting point of the first curve being denoted by $P_j$ ($j=0, 1, 2, \ldots$), and staight line approximation points located one after another from the point of intersection $P_0$ to an end point of the second curve being denoted by $P_j$ ($j=0, 1, 2, \ldots$), said method comprising the steps of:

performing operations of setting $P_{-s} = P_{-E} = P_{i-1}$, $P_s = P_j$ and $P_E = P_{j+1}$ (where i, j each have an initial value of 0), and obtaining points of tangency $P_{-T}$, $P_T$ at which two straight lines $P_{-S}P_{-E}$ and $P_S P_E$ are tangent to a circle of radius R, where $P_{-S}$, $P_{-E}$, $P_S$ and $P_E$ are end points of the straight lines;

determining whether the points of tangency $P_{-T}$, $P_T$ lie between $P_{-E} \sim P_0$ an $P_0 \sim P_E$, respectively;

designating a circular arc $P_{-T}, P_T$ the rounded section curve of the curved surface creating the complex curved machining surface joining the first and second three-dimensional curved machining surface a and inserted at the intersection if the points of tangency $P_{-T}$, $P_T$ lie between $P_{-E} \sim P_0$ and $P_0 \sim P_E$, respectively;

executing said steps of performing, determining an designating, with the operation of setting $i = i-1$ being performed if $P_{-T}$, does not lie between $P_{-E} \sim P_0$ and the operation of setting $j = j+1$ being performed if $P_T$ does not lie between $P_0 \sim P_E$; and machining the complex curved machining surface.

2. A complex curved machining surface creation method according to claim 1, further comprising the steps of:

calculating a distance D between $P_{-S}$ and $P_S$ and determining whether said distance D is greater than 2·R and, if D is greater than 2·R, indicating that rounding having the radius R is impossible to perform.

3. A complex curve machining surface creation method according to claim 2, wherein said designating step includes:

determining whether the point of tangency $P_{-T}$ lies between $P_{-E} \sim P_{-S}$ and whether the point of tangency $P_T$ lies between $P_S \sim P_E$;

designating line segment $P_{i-1}P_{-T}$, arc $P_{-T}P_T$ and line segment $P_T P_{j+1}$ as the rounded section curve if the points of tangency $P_{-T}, P_T$ lie between $P_{-E} \sim P_{-S}$ and between $PE_E \sim P_S$, respectively;

designating line segment $P_{i-1}P_{-T}$, arc $P_{-T}P_T$, line segment $P_T P_j$ and line segment $P_j P_{j+1}$ as the a rounded section curve if the point of tangency $P_{-T}$ lies between $P_{-E} \sim P_{-S}$ and the point of tangency $P_T$ does not lie between $P_E \sim P_S$;

designating line segment $P_{i-1}P_i$, line segment $P_i P_{-T}$, arc $P_{-T}P_T$ and line segment $P_T P_{j+1}$ as the rounded section curve if the point of tangency $P_{-T}$ does not lie between $P_{-E} \sim P_{-S}$ and the point of tangency $P_T$ lies between $P_E \sim P_S$; and designating line segment $P_{i-1}P_i$, line segment $P_i P_T$, arc $P_{-T}P_T$, line segment $P_T P_j$ and line segment $P_j P_{j+1}$ as a rounded section curve if the points of tangency $P_{-T}, P_T$ do not lie between $P_{-E} \sim P_{-S}$ and between $P_E \sim P_S$, respectively.

4. A complex curved machining surface creation method according to claim 3, wherein said first and second curves are section curves obtained when the first and second three-dimensional curved machining surfaces, respectively, are cut by a predetermined section.

5. A complex curved machining surface creation method according to claim 4, further comprising:

generating a group of first and second curves by changing a position of the predetermined section cutting said first and second three-dimensional curved machining surfaces; and generating a complex curved machining surface of radius R between second curves corresponding to each first curve.

6. A complex curved machining surface creation method for generating a curved machining surface with a rounded section having a radius R provided at an intersection where a first curve approximated by straight lines on a first three-dimensional curved machining surface intersects a second curve approximated by straight lines on a second three-dimensional curved machining surface, wherein a point of intersection of the first and second curves being denoted by $P_0$, straight line approximation points located one after another from the point of intersection $P_0$ to a starting point of the first curve being denoted by $P_i$ (i=0, −1, −2, . . . ), and straight line approximation points locate one after another from the point of intersection $P_0$ to an end point of the second curve being denoted by $P_j$ (j=0, 1, 2, . . . ), said method comprising the steps of:

performing operations of setting $P_{-S}=P_i$, $P_{-E}=P_{i-j}$, $P_S=P_j$ and $P_E=P_{j+1}$ (where i, j each have an initial value of 0), and obtaining points of tangency $P_{-T}, P_T$ at which two straight lines $P_{-S}P_{-E}$ and $P_S P_E$ are tangent to a circle of radius R, where $P_{-S}, P_{-E}, P_S$ and $P_E$ are end points of the straight lines;

determining whether the points of tangency $P_{-T}, P_T$ lie on line segments $P_{-S} P_{-E}$ and $P_S P_E$, respectively;

designating a circular arc $P_{-T}P_T$ as the rounded section of the curved machining surface creating the complex curved machining surface joining the first and second three-dimensional curved machining surfaces inserted at the intersection if the points of tangency $P_{-T}, P_T$ lie on line segments $P_{-S}P_{-E}$ and $P_S P_E$;

executing said steps of performing, determining and designating, with the operation of setting i=i−1 being performed if $P_{-T}$ does not lie on $P_{-E}P_E$ and the operation setting j=j+1 being performed if $P_T$ does not lie between $P_S P_E$; and machining the complex curved machining surface.

7. A complex curved machining surface creation method according to claim 6, further comprising the steps of:

calculating a distance D between $P_{-S}$ and $P_S$; and determining whether said distance D is greater than 2·R and, if D is greater than 2·R indicating that rounding having the radius R is impossible to perform.

* * * * *

UNITED STATES PATENT AND TRADEMARK OFFICE
CERTIFICATE OF CORRECTION

Page 1 of 2

PATENT NO. : 4,855,926

DATED : August 8, 1989

INVENTOR(S) : Seki et al.

It is certified that error appears in the above-identified patent and that said Letters Patent is hereby corrected as shown below:

Col. 1, line 7, "comining" s/b --combining--;

line 9, "complete" s/b --complex--.

Col. 3, line 41, "$_{\text{does not lie between}}$" s/b --does not lie between--.    (the letters should not be subscript)

Col. 4, line 66, "122" s/b --102--.

Col. 6, line 56, "0>j" s/b --0→j--.

Col. 7, line 23, "are shown" s/b --are as shown--;

line 26, "$\overline{P_{i-1}P_{-T}} \to \overset{\frown}{P_{-T}} \to P_{-T} \to \overline{P_T P_j} \to \overline{P_j P_{j+1}}$" s/b
--$\overline{P_{i-1}P_{-T}} \to \overset{\frown}{P_{-T}} P_T \to \overline{P_T P_j} \to \overline{P_j P_{j+1}} \to$--.

Col. 8, line 1, "$P_{-E}P_S$" s/b --$P_{-E}P_{-S}$--;

line 6, line should read as follows:
--$\overline{P_{i-1}P_{-T}} \to \overset{\frown}{P_{-T}} P_T \to \overline{P_T P_{j+1}}$--;

line 38, "$P_j(j=0,1,2,...)$" s/b --$P_i$ (i = 0, -1, -2,...)--;

UNITED STATES PATENT AND TRADEMARK OFFICE
CERTIFICATE OF CORRECTION

PATENT NO. : 4,855,926            Page 2 of 2

DATED : August 8, 1989

INVENTOR(S) : Seki et al.

It is certified that error appears in the above-identified patent and that said Letters Patent is hereby corrected as shown below:

line 44 and 45, "$P_{-s}=P_{-E}=P_{i-1}$, $P_s=P_j$ and $P_E=P_{j+1}$" s/b --$P_{-S} = P_i$, $P_{-E} = P_{i-1}$, $P_S = P_j$ and $P_E = P_{j+1}$--;

line 55 and 56, "surface a and inserted" s/b --surfaces and inserted--;

line 59, "an" s/b --and--;

line 68, "and" s/b --; and--.

Col. 9, line 5, "curve" s/b --curved--;

line 14, "$PE_E$" s/b --$P_E$--.

Col. 10, lines 15 and 16, "$P_{-E}=P_{i-j}$, $Ps=P_j$" s/b --$P_{-E}=P_{i-1}$, $P_s=P_j$--.

Signed and Sealed this

Seventh Day of August, 1990

*Attest:*

HARRY F. MANBECK, JR.

*Attesting Officer*      *Commissioner of Patents and Trademarks*